United States Patent
Sun et al.

(10) Patent No.: US 11,770,647 B2
(45) Date of Patent: Sep. 26, 2023

(54) TASK ASSIGNING METHOD AND TASK ASSIGNING DEVICE

(71) Applicant: MEDIATEK INC., Hsin-Chu (TW)

(72) Inventors: Liang-Che Sun, Hsinchu (TW); Yiou-Wen Cheng, Hsinchu (TW); Shang-Hsiu Wu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/544,956

(22) Filed: Dec. 8, 2021

(65) Prior Publication Data

US 2022/0248122 A1 Aug. 4, 2022

Related U.S. Application Data

(60) Provisional application No. 63/144,554, filed on Feb. 2, 2021.

(51) Int. Cl.
*H04R 1/10* (2006.01)
*G06F 9/48* (2006.01)
*H04H 20/47* (2008.01)

(52) U.S. Cl.
CPC ......... *H04R 1/1041* (2013.01); *G06F 9/4887* (2013.01); *H04R 2420/07* (2013.01)

(58) Field of Classification Search
CPC .. H04R 1/1041; H04R 2420/07; G06F 9/4887
USPC ....................................................... 381/74, 2
See application file for complete search history.

(56) References Cited

U.S. PATENT DOCUMENTS

| 2016/0342805 | A1 | 11/2016 | Lim | |
| 2020/0396017 | A1* | 12/2020 | Liu | .......... H04W 4/80 |
| 2021/0211853 | A1* | 7/2021 | Zheng | ..................... H04W 4/80 |

FOREIGN PATENT DOCUMENTS

| CN | 110248341 A | 9/2019 |
| TW | 200810454 | 2/2008 |
| TW | I711932 B | 12/2020 |

* cited by examiner

*Primary Examiner* — Ammar T Hamid
(74) *Attorney, Agent, or Firm* — Winston Hsu

(57) ABSTRACT

A task assigning method of adaptively assigning at least one operation task is applied for a task assigning device including a first electronic device and a second electronic device communicated with each other in a wireless manner. The task assigning method includes acquiring a first detection parameter of the first electronic device, and adjusting a task transmission rate from the first electronic device to the second electronic device in accordance with the first detection parameter.

18 Claims, 4 Drawing Sheets

TASK ASSIGNING METHOD AND TASK ASSIGNING DEVICE

CROSS REFERENCE TO RELATED APPLICATIONS

This application claims the benefit of U.S. provisional application No. 63/144,554 (which was filed on Feb. 2, 2021). The entire contents of the related application are incorporated herein by reference.

BACKGROUND

With the advanced technology, an active noise reduction Bluetooth earphone becomes a popular consumable electronic product. The active noise reduction Bluetooth earphone can have several sound receivers respectively disposed on a front side and a rear side of the earphone. The sound receivers collect sound signals, and the sound signals are processed via beamforming, acoustic echo cancellation and noise reduction technology and then transmitted to the smart phone via Bluetooth communication. The active noise reduction Bluetooth earphone has a small size to be comfortably worn; however, the small size means the active noise reduction Bluetooth earphone cannot have preferred power storage and operation efficiency, and the foresaid beamforming, acoustic echo cancellation and noise reduction technology are high power consumption procedures. Thus, design of a task assigning method capable of adjusting signal procedures via an analysis result of the power level and the operation efficiency to increase an operation period of the earphone is an important issue in the communication industry.

SUMMARY

The present invention provides a task assigning method and a task assigning device of adaptively assigning at least one operation task between different electronic devices for solving above drawbacks.

According to the claimed invention, a task assigning method of adaptively assigning at least one operation task is applied for a first electronic device and a second electronic device communicated with each other in a wireless manner. The task assigning method includes acquiring a first detection parameter of the first electronic device, and adjusting a task transmission rate from the first electronic device to the second electronic device in accordance with the first detection parameter.

According to the claimed invention, a task assigning device of adaptively assigning at least one operation task between different electronic devices includes a first electronic device, a second electronic device and a central host. The first electronic device has a first detector. The second electronic device is communicated with the first electronic device in a wireless manner. The central host is adapted to acquire and analyze a first detection parameter generated by the first detector, and adjust a task transmission rate from the first electronic device to the second electronic device in accordance with an analysis result of the first detection parameter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
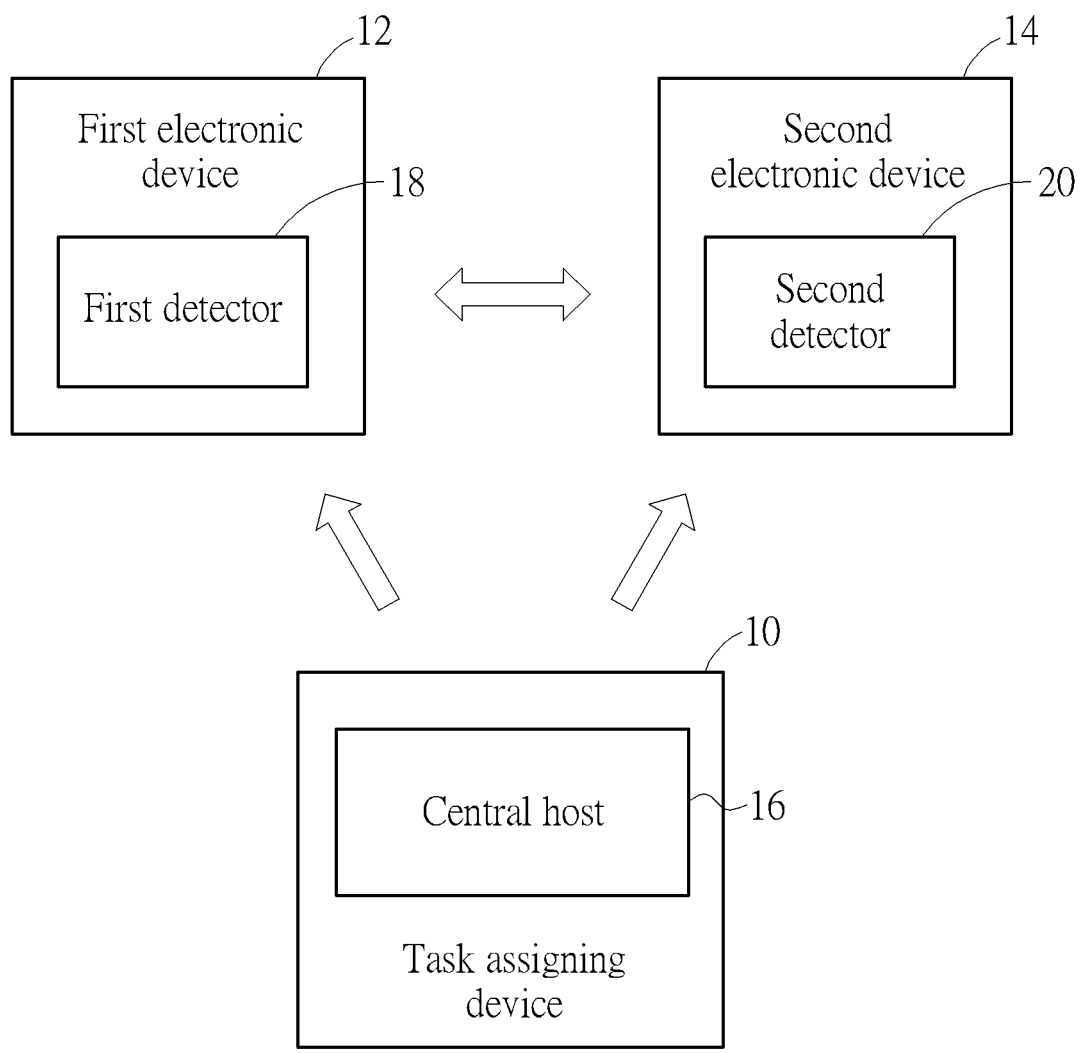
FIG. 1 is a functional block diagram of a task assigning device according to an embodiment of the present invention.

Please refer to FIG. 1. FIG. 1 is a functional block diagram of a task assigning device 10 according to an embodiment of the present invention. The task assigning device 10 can be a part of a first electronic device 12 or a part of a second electronic device 14, or may be represented as the first electronic device 12 or the second electronic device 14. In some embodiments, the task assigning device 10 can be a device other than the first electronic device 12 and the second electronic device 14. The task assigning device 10 can include a central host 16 used to execute task processing. The first electronic device 12 can be communicated with the second electronic device 14 in a wireless manner, such as Bluetooth, WiFi or utilizing any other wireless communication method. The central host 16 can be communicated with the first electronic device 12 and the second electronic device 14 in a wired manner or in the wireless manner. For example, the central host 16 can be an operation processor of the first electronic device 12, or an operation processor of the second electronic device 14, or an operation controller independent of the first electronic device 12 and the second electronic device 14. Types of the central host 16 are not limited to the above-mentioned embodiments, which depend on a design demand.

The task assigning device 10 can analyze a detection parameter generated by at least one of the first electronic device 12 and the second electronic device 14, and determine which electronic device can afford partial simple or partial complex operation loading in accordance with an analysis result of the detection parameter, so as to adaptively assign operation tasks for the first electronic device 12 and the second electronic device 14. The first electronic device 12 can have a first detector 18, and the second electronic device 14 can have a second detector 20. The first detector 18 and the second detector 20 can be, but not limited to, a battery detector, a motion detector or a proximity detector which respectively provides a battery level, a motion detecting result and a proximity detecting result as the detection parameter. Variation of the detectors and the detection parameters are not limited to the above-mentioned embodiments, and depend on the design demand.

When the first electronic device 12 has an unprocessed task, the task assigning device 10 can analyze the battery level of the first electronic device 12 to accordingly decide assignment of the unprocessed task between the first electronic device 12 and the second electronic device 14. If the battery level of the first electronic device 12 is in a high level, the task assigning device 10 can control the first electronic device 12 to process most of the unprocessed task; the processed task and few of the unprocessed task can be transmitted from the first electronic device 12 to the second electronic device 14 for accomplishing the whole task. If the battery level of the first electronic device 12 is in a low level, the task assigning device 10 may control the first electronic device 12 to process few or none of the unprocessed task; the processed task and most of the unprocessed task can be transmitted to the second electronic device 14 for accomplishing the whole task. Therefore, the task assigning device 10 can adjust a task transmission rate between the first electronic device 12 and the second electronic device 14, and the task transmission rate can be a size of the operation task, a task compression ratio or a task transmission speed output by the first electronic device 12.

If the first electronic device 12 has 100 Megabytes (MB) of the unprocessed task and the task transmission rate is defined as the size of the operation task, the first electronic device 12 can process 70 MB of the task when the battery level is in the high level, and 30 MB of the unprocessed task can be transmitted to the second electronic device 14 for execution; further, the first electronic device 12 may process 30 MB of the task when the battery level is in the low level, and 70 MB of the unprocessed task can be transmitted to the second electronic device 14 for execution. If the task transmission rate is defined as the task compression ratio, the first electronic device 12 can apply reversal compression to the unprocessed task and then transmit to the second electronic device 14 when the battery level is in the high level, and may apply irreversible compression to the unprocessed task when the battery level is in the low level. If the task transmission rate is defined as the task transmission speed, the first electronic device 12 can increase the task transmission speed for transmission toward the second electronic device 14 when the battery level is in the high level, and may decrease the task transmission speed when the battery level is in the low level.

Besides, the task assigning device 10 can further determine an amount of acceptable computation of the first electronic device 12 and the second electronic device 14 by referring to the battery level of the first electronic device 12 and the second electronic device 14, so as to decide the task transmission rate from the first electronic device 12 to the second electronic device 14. For example, when the battery level of the first electronic device 12 is in an ordinary low level but the battery level of the second electronic device 14 is in an extreme low level, the amount of acceptable computation of the first electronic device 12 can be better than the amount of acceptable computation of the second electronic device 14, so that most of the unprocessed task can be assigned to the first electronic device 12 for reducing the operation loading of the second electronic device 14.

Figure 2:
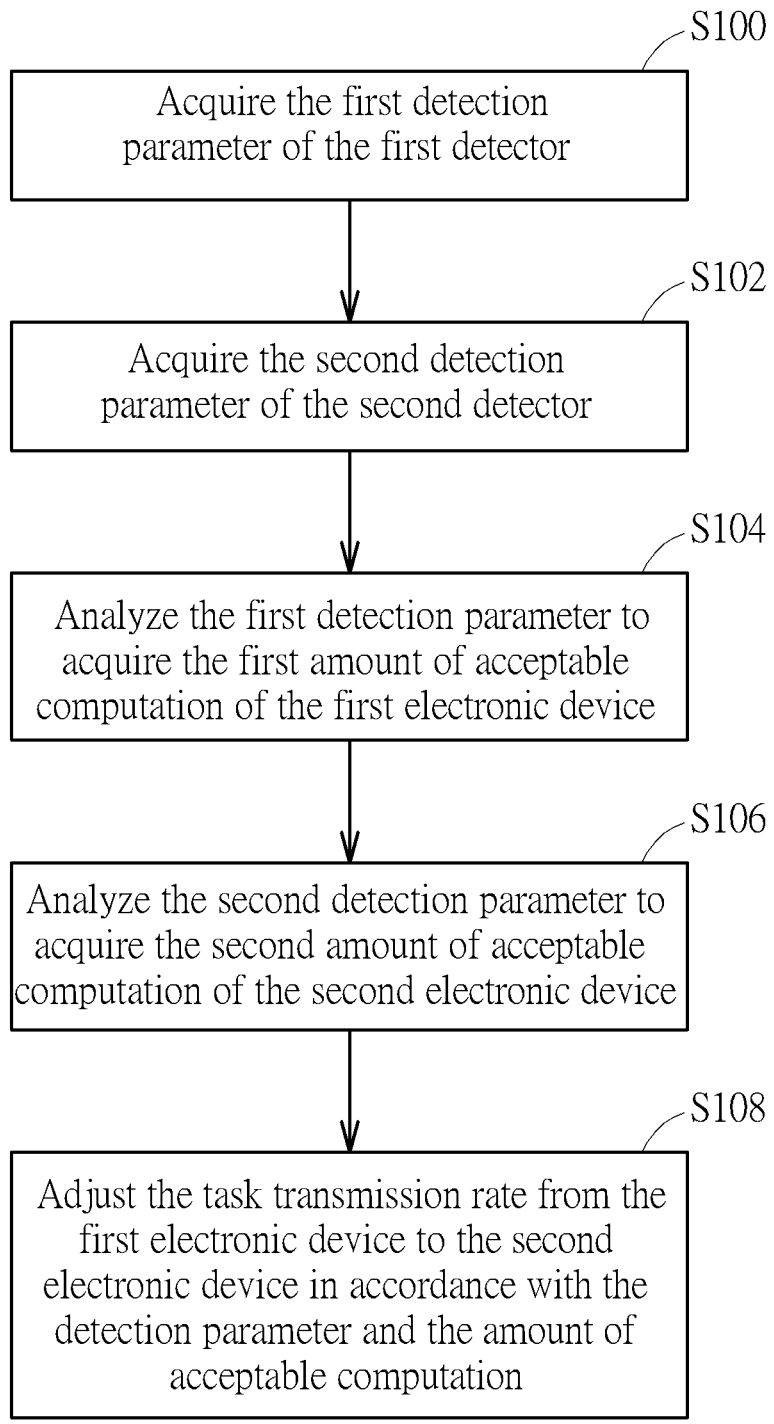
FIG. 2 is a flow chart of a task assigning method according to the embodiment of the present invention.

Please refer to FIG. 2. FIG. 2 is a flow chart of a task assigning method according to the embodiment of the present invention. The task assigning method illustrated in FIG. 2 can be suitable for the task assigning device 10 shown in FIG. 1. According to the task assigning method, steps S100 and S102 can be executed to acquire a first detection parameter of the first detector 18 and a second detection parameter of the second detector 20. The detection parameters can be one or several of the battery level, the motion detecting result and the proximity detecting result, or can be other kinds of detection results. Then, steps S104 and S106 can be executed to analyze the first detection parameter for acquiring a first amount of acceptable computation of the first electronic device 12, and analyze the second detection parameter for acquiring a second amount of acceptable computation of the second electronic device 14. The amount of acceptable computation may be represented as a continuous period of each electronic device kept in preferred operation efficiency due to a current value of the detection parameter. For example, if the battery level of the first electronic device 12 is in the low level as a first condition, the first electronic device 12 may be shut down after five minutes (which can be defined as the first amount of acceptable computation), so that the complicated operation task cannot be executed by the first electronic device 12, and be assigned to the second electronic device 14 in the high battery level. If the battery level of the first electronic device 12 is in the high level as a second condition, the first electronic device 12 can be operated for a long period, and therefore the complicated operation task can be by the first electronic device 12 for sharing operation loading of the second electronic device 14.

Final, step S108 can be executed to adjust the task transmission rate from the first electronic device 12 to the second electronic device 14 in accordance with at least one of the first amount of acceptable computation and the second amount of acceptable computation. In the present invention, the task assigning method can analyze the first detection parameter and the second detection parameter to acquire the first amount of acceptable computation and the second amount of acceptable computation, and then utilize the first amount of acceptable computation and the second amount of acceptable computation to adjust the task transmission rate; however, the task assigning method can further adjust the task transmission rate directly by the analysis result of the first detection parameter and the second detection parameter, such as deciding the task transmission rate via a percentage of the battery level.

Figure 3:
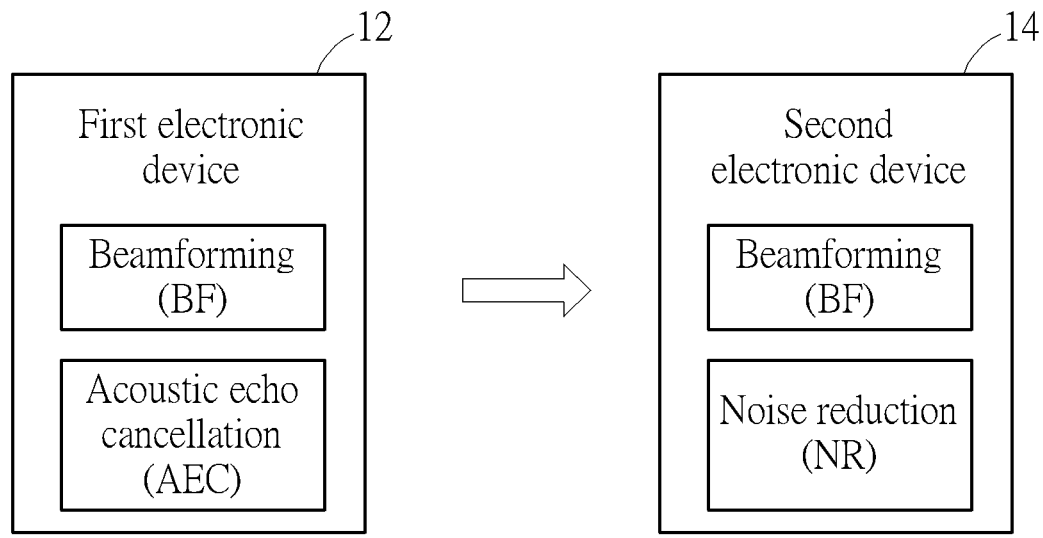
FIG. 3 is a functional block diagram of a first electronic device and a second electronic device according to a first embodiment of the present invention.

Please refer to FIG. 3. FIG. 3 is a functional block diagram of the first electronic device 12 and the second electronic device 14 according to a first embodiment of the present invention. The first electronic device 12 can be a wireless earphone, and the second electronic device 14 can be a smart phone. The first electronic device 12 can have a plurality of sound receivers, and sound signals received by the plurality of sound receivers can be processed via a group consisting of beamforming (BF) technology, acoustic echo cancellation (AEC) technology, noise reduction (NR) technology, any possible signal processing technology, and a combination therefore for better performance. In the first embodiment, a task processing procedure of the operation task includes several processing procedures, such as a first processing procedure being the BF technology and the AEC technology, and a second processing procedure being the BF technology and the NR technology; one processing procedure may have task processing technology identical with or different from the task processing technology of another processing procedure.

Thus, the task assigning method can apply the first processing procedure (such as the BF technology and the AEC technology) on the plurality of sound signals via the first electronic device 12 to acquire a first procedure datum, and the first procedure data respectively generated by the left-ear first electronic device 12 and the right-ear first electronic device 12 can be transmitted to the second electronic device 14; then, the second electronic device 14 can execute the second processing procedure (such as the BF technology and the NR technology) on the first procedure datum to acquire final data. The final data acquired by the second processing procedure of the second electronic device 14 can be used for other application. The first embodiment can execute different processing procedures respectively on the first electronic device 12 and the second electronic device 14.

Figure 4:
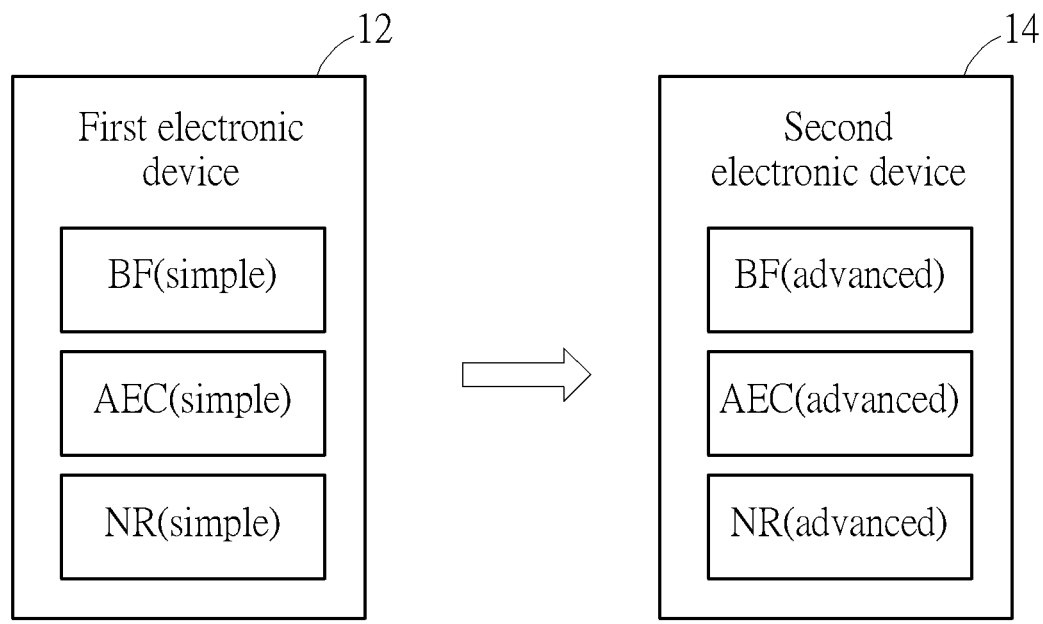
FIG. 4 is a functional block diagram of the first electronic device and the second electronic device according to a second embodiment of the present invention.

Please refer to FIG. 4. FIG. 4 is a functional block diagram of the first electronic device 12 and the second electronic device 14 according to a second embodiment of the present invention. In the second embodiment, elements having the same numerals as ones of the first embodiment have the same or similar property, and a detailed description is omitted herein for simplicity. The task assigning method of the second embodiment can have a task processing phase of the operation task including several processing phases, such as a first processing phase being a simply processing phase of the BF technology, the AEC technology and the NR technology, and a second processing phase being an advanced processing phase of the BF technology, the AEC technology and the NR technology. The task assigning method can apply the simply processing phase (which means the first processing phase) on the plurality of sound signals via the first electronic device 12 to generate a first phase datum; then, the first phase datum can be transmitted to the second electronic device 14, and the second electronic device 14 with the high battery level and preferred operation efficiency can execute the advanced processing phase (which means the second processing phase).

Figure 5:
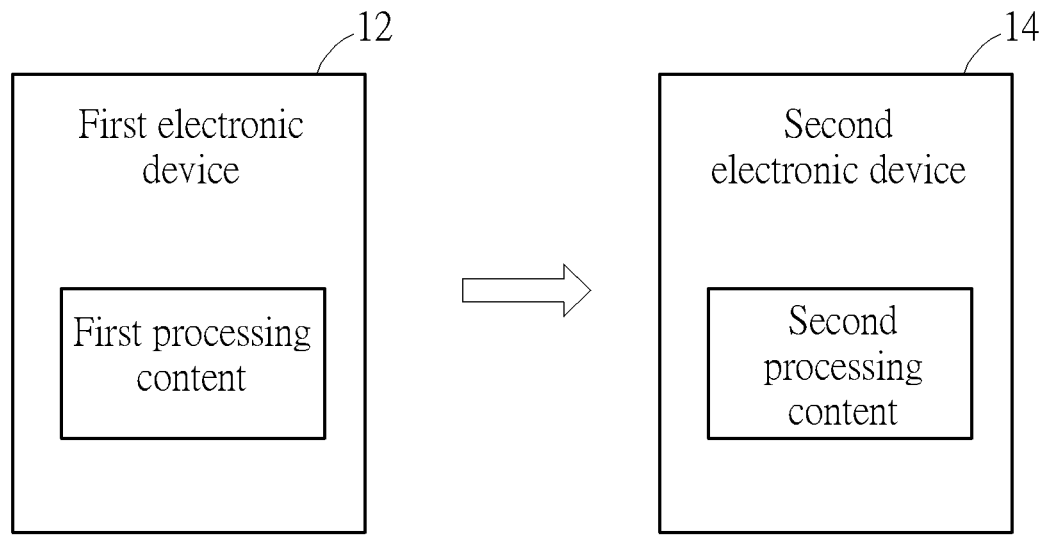
FIG. 5 is a functional block diagram of the first electronic device and the second electronic device according to a third embodiment of the present invention.

Please refer to FIG. 5. FIG. 5 is a functional block diagram of the first electronic device 12 and the second electronic device 14 according to a third embodiment of the present invention. In the third embodiment, elements having the same numerals as ones of the foresaid embodiment have the same or similar property, and a detailed description is omitted herein for simplicity. The task assigning method of the third embodiment can have task processing content of the operation task including several processing content, such as first processing content being a thirty percent of an original task, and second processing content being a seventy percent of the original task. The task assigning method can execute the BF technology, the AEC technology and the NR technology on the first processing content via the first electronic device 12; then, the processed first processing content and the unprocessed second processing content can be transmitted to the second electronic device 14. The second electronic device 14 can execute the BF technology, the AEC technology and the NR technology on the unprocessed second processing content, and then the processed second processing content can be assembled with the processed first electronic device 12 for acquiring the final data.

Figure 6:
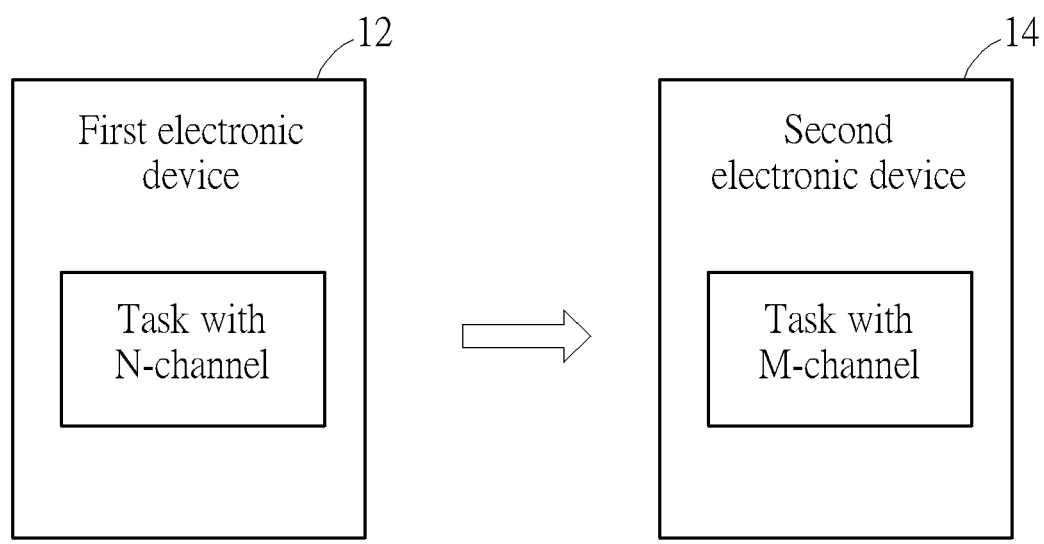
FIG. 6 is a functional block diagram of the first electronic device and the second electronic device according to a fourth embodiment of the present invention.

Please refer to FIG. 6. FIG. 6 is a functional block diagram of the first electronic device 12 and the second electronic device 14 according to a fourth embodiment of the present invention. In the fourth embodiment, elements having the same numerals as ones of the foresaid embodiment have the same or similar property, and a detailed description is omitted herein for simplicity. The task assigning method of the fourth embodiment can transform the operation task with N-channel generated by the first electronic device 12 into the operation task with M-channel, and transmit the operation task with M-channel to the second electronic device 14; the second electronic device 14 can execute the BF technology, the AEC technology and the NR technology on the operation task with M-channel. For example, the first electronic device 12 may have three sound receivers to generate three-channel tasks (a numeral N being equal to 3), and the task assigning method can combine the three-channel task into one-channel task (a numeral M being equal to 1) and transmit to the second electronic device 14, so that the second electronic device 14 can apply the BF technology, the AEC technology and the NR technology on the one-channel task.

In conclusion, the first embodiment can execute some processing procedures by the first electronic device 12 (which may be the earphone with low operation efficiency due to the low battery level), and execute other processing procedures by the second electronic device 14 (which may be the earphone with high operation efficiency due to the high battery level). The second embodiment can execute the simply processing phase by the first electronic device 12, and the task processed by the simply processing phase can be transmitted to the second electronic device 14 for executing the advanced processing phase. The third embodiment can execute few of the processing content by the first electronic device 12, and most of the processing content can be executed by the second electronic device 14. The fourth embodiment can combine the operation task with plural channels into the operation task with less channels or one channel by the first electronic device 12, and the combined operation task can be transmitted to the second electronic device 14 for the task processing (such as the BF technology, the AEC technology and the NR technology). Besides, the present invention can provide a fifth embodiment that the first electronic device 12 may not process the operation task and transmit the unprocessed task to the second electronic device 14, and the second electronic device 14 can execute the full task processing on the unprocessed task.

In steps S104 and S106, the task assigning method can compare the detection parameter with a reference range; when the detection parameter conforms to the reference range, the task assigning method can decide the task transmission rate in accordance with a preset condition of the reference range. For example, if the detection parameter is the battery level showed as a percentage, and the reference range can include one range about 20~30% and another range about 10~20%. When the battery level is within the range about 20~30%, the first electronic device 12 is in the low battery level but still can afford part of the operation loading; when the battery level is within the range about 10~20%, the first electronic device 12 is prepared to shut down, and all the operation loading can be assigned to the second electronic device 14 via the task assigning method of the fifth embodiment.

Further, the task assigning method may compare the detection parameter with a specific reference parameter, which can be pre-stored in a memory unit (not shown in the figures) of the first electronic device 12 or the second electronic device 14. The specific reference parameter may be represented as a full power marker. The task assigning method can compute a ratio of the detection parameter to the reference parameter, and decide the task transmission rate in accordance with the computed ratio. For example, the detection parameter is the battery level showed as a bar-type marker. The reference parameter (which means the full power marker) can be a five-bar pattern on the screen of the electronic device. The present invention can compute the bar ratio of the detection parameter to the reference parameter, and decide the task transmission rate of the task assigning device 10 by the task assigning method in different embodiments when the bar ratio is varied from one computed ratio (which is ranged between 0.2~0.4) to another computed ratio (which is ranged between 0~0.2).

In the present invention, the first electronic device 12 and the second electronic device 14 can have neural net computation function; the first electronic device 12 has simply function of the neural net computation due to a small size and less power storage, and the second electronic device 14 has advanced function of the neural net computation due to a large size and preferred power storage. A value and a related varied range of the task transmission rate decided by the detection parameter of the first electronic device 12 and the second electronic device 14 of the task assigning device 10 can be preset by the manufacturer, or freely adjust by the consumer, or automatically set via a type and amplitude of the detection parameter.

In other possible embodiments, the first electronic device 12 may be a smart watch, and the second electronic device 14 may be the smart phone. The first detector 18 of the first electronic device 12 can be the motion detector; the first electronic device 12 can execute feature extraction and simple motion recognition with lower operation loading in accordance with the motion detecting result of the motion detector. The simple motion recognition may recognize the motion detecting result belonging to running, walking or falling, and be transmitted to the second electronic device 14. The second electronic device 14 can execute advanced motion recognition for recognizing a user who wears the smart watch is running in high speed or low speed, walking in high speed or low speed, or falling by itself or an attack.

In other possible embodiments, the first electronic device 12 may be the smart watch or the wireless earphone, and the second electronic device 14 may be the smart phone or the notebook computer. The first detector 18 of the first electronic device 12 can be the sound receiver; the first electronic device 12 can execute feature extraction and simple word recognition with lower operation loading in accordance with the sound signal received by the sound receiver, and when the second electronic device 14 is awaken by a result of the simple word recognition, the second electronic device 14 can execute advanced word recognition (such as deep learning) for accurately recognizing content of the sound signal and actuating a related application program.

If the first electronic device 12 is the wireless earphone and the second electronic device 14 is the smart phone, the second electronic device 14 may be matched with a set of two first electronic devices 12 respectively for the left ear and the right ear. The detection parameter generated by the left-ear first electronic device 12 may be asynchronous with the detection parameter generated by the right-ear first electronic device 12, so the second electronic device 14 can preferably have a sound delay calibration function for ensuring that the sound signals from different first electronic devices 12 can be accurately analyzed and assembled in synchrony. In conclusion, the task assigning device 10 and the task assigning method of the present invention can decide an acceptable operation loading of the first electronic device 12 in accordance with the first detection parameter, and assign some of or all the operation task to the second electronic device 14, so as to prevent the first electronic device 12 from quickly shutting down due to the low battery level.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A task assigning method of adaptively assigning at least one operation task, a task processing procedure of the operation task comprises at least a first processing procedure and a second processing procedure, or a task processing phase of the operation task comprises at least a first processing phase and a second processing phase, the task assigning method comprising:

acquiring a first detection parameter of a first electronic device, wherein the first electronic device communicates with a second electronic device in a wireless manner;

executing the first processing procedure or the first processing phase by the first electronic device to respectively generate a first procedure datum or a first phase datum; and transmitting the first procedure datum or the first phase datum to the second electronic device for respectively executing the second processing procedure or the second processing phase, so as to adjust a task transmission rate from the first electronic device to the second electronic device in accordance with the first detection parameter.

2. The task assigning method of claim 1, wherein the first detection parameter corresponds to a battery level, or a motion detecting result, or a proximity detecting result.

3. The task assigning method of claim 1, wherein the task transmission rate corresponds to a size of the operation task, or a task compression ratio, or a task transmission speed output by the first electronic device.

4. The task assigning method of claim 1, further comprising:

acquiring a second detection parameter of the second electronic device; and adjusting the task transmission rate in accordance with the first detection parameter and the second detection parameter.

5. The task assigning method of claim 1, wherein task processing content of the operation task at least comprises first processing content and second processing content, and adjusting the task transmission rate from the first electronic device to the second electronic device in accordance with the first detection parameter comprises:

processing the first processing content by the first electronic device;

transmitting the processed first processing content and the second processing content to the second electronic device; and processing the second processing content to assemble with the processed first processing content by the second electronic device.

6. The task assigning method of claim 1, wherein adjusting the task transmission rate from the first electronic device to the second electronic device in accordance with the first detection parameter comprises:

transmitting an unprocessed task of the first electronic device to the second electronic device, such that the second electronic device analyzes the unprocessed task.

7. The task assigning method of claim 1, wherein adjusting the task transmission rate from the first electronic device to the second electronic device in accordance with the first detection parameter comprises:

transforming the operation task with N-channel generated by the first electronic device into the operation task with M-channel; and transmitting the operation task with M-channel to the second electronic device;

wherein a value of N is greater than a value of M.

8. The task assigning method of claim 1, further comprising:

comparing the first detection parameter with a reference range; and deciding the task transmission rate in accordance with a preset condition of the reference range when the first detection parameter conforms to the reference range.

9. The task assigning method of claim 1, further comprising:
computing a ratio of the first detection parameter to a reference parameter; and
deciding the task transmission rate in accordance with the computed ratio.

10. A task assigning device of adaptively assigning at least one operation task between different electronic devices, a task processing procedure of the operation task comprising at least a first processing procedure and a second processing procedure, or a task processing phase of the operation task comprising at least a first processing phase and a second processing phase, the task assigning device comprising:
a central host adapted to acquire and analyze a first detection parameter generated by a first detector of a first electronic device, and drive the first electronic device to execute the first processing procedure or the first processing phase for respectively generating a first procedure datum or a first phase datum, and transmit the first procedure datum or the first phase datum from the first electronic device to the second electronic device for respectively executing the second processing procedure or the second processing phase, so as to adjust a task transmission rate from the first electronic device to a second electronic device in accordance with an analysis result of the first detection parameter, wherein the first electronic device communicates with the second electronic device in a wireless manner.

11. The task assigning device of claim 10, wherein the central host is an operation processor of the first electronic device, or an operation processor of the second electronic device, or an operation controller independent of the first electronic device and the second electronic device.

12. The task assigning device of claim 10, wherein the first detector corresponds to a battery detector, a motion detector or a proximity detector.

13. The task assigning device of claim 10, wherein the central host adjusts a size of the operation task, or a task compression ratio, or a task transmission speed output by the first electronic device.

14. The task assigning device of claim 10, wherein the second electronic device comprises a second detector, and the central host is further adapted to acquire and analyze a second detection parameter of the second electronic device, and adjust the task transmission rate in accordance with the first detection parameter and the second detection parameter.

15. The task assigning device of claim 10, wherein task processing content of the operation task at least comprises first processing content and second processing content, and the central host is further adapted to drive the first electronic device to process the first processing content, transmit the processed first processing content and the second processing content from the first electronic device to the second electronic device, and drive the second electronic device to process the second processing content for assembling with the processed first processing content.

16. The task assigning device of claim 10, wherein the central host is further adapted to transmit an unprocessed task of the first electronic device to the second electronic device, such that the second electronic device analyzes the unprocessed task.

17. The task assigning device of claim 10, wherein the central host is further adapted to transform the operation task with N-channel generated by the first electronic device into the operation task with M-channel, and transmit the operation task with M-channel to the second electronic device for execution, and a value of N is greater than a value of M.

18. The task assigning device of claim 10, wherein the central host is further adapted to compare the first detection parameter with a reference range or a reference parameter, and decide the task transmission rate in accordance with a comparison result.

* * * * *